United States Patent [19]

Pardes et al.

[11] Patent Number: 4,612,441

[45] Date of Patent: Sep. 16, 1986

[54] MOVING OBJECT DETECTION SYSTEM USING INFRARED SCANNING

[75] Inventors: Herman Pardes, Ocean; William J. Mills, Oakhurst, both of N.J.

[73] Assignee: The United States of America as represented by the Secretary of the Army, Washington, D.C.

[21] Appl. No.: 639,054

[22] Filed: Aug. 9, 1984

[51] Int. Cl.[4] ............................................. G01J 1/00
[52] U.S. Cl. ................................... 250/342; 250/349
[58] Field of Search .................... 250/342, 349, 347; 343/7.7; 358/105; 350/567

[56] References Cited

U.S. PATENT DOCUMENTS

| | | | |
|---|---|---|---|
| 2,951,160 | 8/1960 | McCartney | 250/347 |
| 3,418,478 | 12/1968 | Falbel | 250/342 |
| 3,920,994 | 11/1975 | Cargille | 250/347 |
| 4,124,865 | 11/1978 | Zwirn | 250/203 CT |
| 4,218,703 | 8/1980 | Netravali et al. | 358/105 |
| 4,222,050 | 9/1980 | Kiuchi et al. | 343/7.7 |
| 4,266,130 | 5/1981 | Kuhn | 250/342 |
| 4,361,840 | 11/1982 | Hauptmann | 343/7.7 |
| 4,383,272 | 5/1983 | Netravali et al. | 358/105 |

FOREIGN PATENT DOCUMENTS

| | | | |
|---|---|---|---|
| 730777 | 3/1966 | Canada | 250/349 |
| 2041689 | 9/1980 | United Kingdom | 358/105 |

*Primary Examiner*—Carolyn E. Fields
*Assistant Examiner*—Richard Hanig
*Attorney, Agent, or Firm*—Anthony T. Lane; Jeremiah G. Murray; Edward Goldberg

[57] ABSTRACT

An infrared moving object detection system comprising first and second infrared detectors and an optical scanning system mounted in an aircraft for scanning along first and second paths on the ground, with the detectors receiving infrared radiation from objects in the two paths. One path is a small angle ahead of the aircraft, and the second path is the same as the first path when the aircraft is directly above it. Electronic circuit means compares the infrared information in the two paths to determine whether "hot" objects are in the same place in both paths, and, if they are not, it is known that one or more objects are moving objects.

7 Claims, 3 Drawing Figures

MOVING OBJECT DETECTION SYSTEM USING INFRARED SCANNING

The invention described herein may be manufactured, used, and licensed by or for the Government for governmental purposes without the payment to us of any royalty thereon.

BACKGROUND OF THE INVENTION

The present invention relates to aerial scanning of the ground to detect movement of objects on the ground. In the past, radar has been used for scanning the ground from the air to detect moving targets. Radar is an active system; that is, it employs transmitted and received signals in its operation. However, passive systems which do not use transmitted signals are preferred because they are less vulnerable to detection and jamming. Although infrared sensing has been employed in detection systems, no efficient passive system is known which is computerized and can automatically identify moving objects with optimum efficiency.

DESCRIPTION OF THE INVENTION

Figure 1:
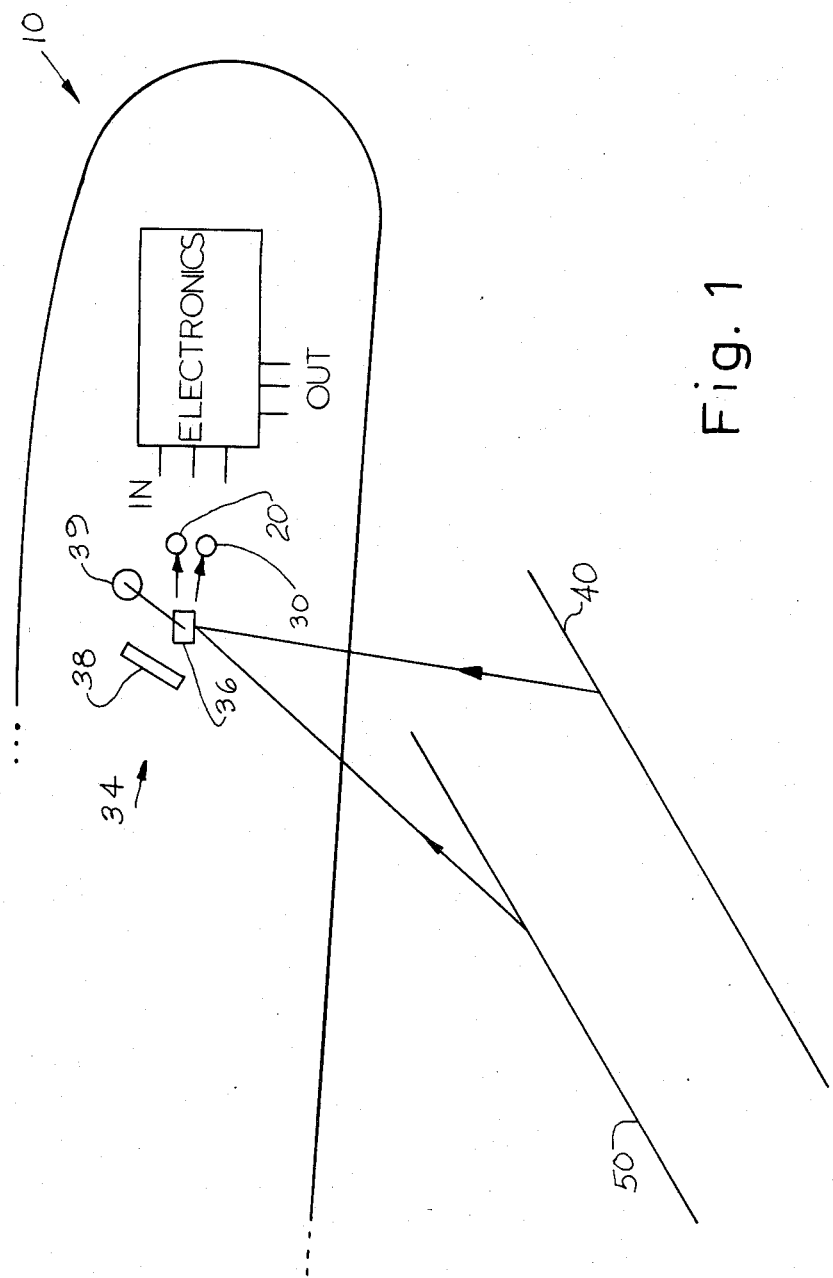
FIG. 1 is a schematic representation of an aircraft carrying the apparatus of the invention and illustrating its operation.

Briefly, the system of the invention operates as follows. As an aircraft carrying two infrared (IR) detectors flies along, a transverse path ahead of the aircraft is scanned and thermal information is received by a first IR detector known as the forward IR detector, and each "hot spot" is detected. Angular location is continually available from the scanning optics, and the position of the "hot spot" is provided in digital form, and this information and the time of detection are stored in a register. Later, when the forward scanned path is directly under the aircraft, another scan is made, and thermal information is received by a second IR detector known as the nadir detector. This thermal information, time, and position are stored in a register, and the two stored groups of information are compared. If, on the nadir scan, the same hot spot is detected, then this is not a moving target. But, if no hot spot target is detected where it was detected on the forward scan, but a hot spot is present a few degrees away, an associated computer detects this fact and calls out the original hot spot as a probable moving target.

Referring now to the drawings for a more detailed description of the invention, the system of the invention 10 which is carried by an aircraft includes two infrared sensors or detectors 20 and 30 for sensing objects, hot spots, by means of the heat or infrared (IR) energy the objects emit. The sensors, and an associated optical system 34, are mounted for scanning along two paths transverse to the direction of flight, and they are positioned so that the optical system scans along a path 40 which is some distance ahead of the aircraft and focuses IR energy on detector 30, the forward detector, and the optical system is also able to scan along a path 50 which is parallel to the path 40 but is vertically beneath the aircraft and focuses IR energy on detector 20 which is the nadir detector. The forward path 40 is ahead of the nadir path 50 by a relatively small angle which may be about 5°. As a practical matter, both forward and nadir scans occur at the same time, and the associated electronic system, including a computer, correlates the two related forward and nadir scans.

A specific optical system for providing the desired scanning is not shown in complete detail since such systems are well known. These optical systems generally include a rotating reflective prism 36 and a combination of lenses, represented by numeral 38, having a wide angle for the mechanical scan, and refractive lenses to provide a large, flat-field focal plane. An optical encoder 39 is mounted on the same shaft as the prism 36. The optical system 34 is properly stabilized in the aircraft.

The drive apparatus for the rotating prism also drives the optical, angular encoder 39, and, as the prism 36 rotates to provide the desired wide angle scan, the angular position of the scanning system at any instant is provided by the encoder which generates a series of pulses. The system also includes a clock system for providing pulses which can be combined with the position information in locating hot spots.

In the electronic circuitry (FIG. 2) associated with the detectors 20 and 30, the forward detector 30 is coupled to an amplifier 60 and then to an analog-to-digital (A/D) converter 70, the output of which is coupled to a threshold adjustment 90 for biasing out normal ground noise and then to a pulse width discriminator 100 which is included for compensating for ground features such as wide roads or the like which are too large to be proper targets. The output of the pulse width discriminator 100, which may be one or more signals representing hot spots, is entered in a register 102 and in the system computer 104. Information from the system clock 110 and optical encoder are also entered in the register 102 and computer 104 so that the location and time of detection of hot spots in the forward scan are present.

The other sensor or detector 20, the nadir detector, is similarly coupled through an amplifier 114, an analog/digital converter 120, and threshold adjustment 130 to a pulse width discriminator 140. The output of the pulse width discriminator 140, along with clock and encoder information, is coupled to a register 150 and to the computer 104. Registers 102 and 150 are coupled to a register comparator 160, the output of which is coupled to the computer. Aircraft velocity and altitude information are fed into the computer to permit "hot spot" motion determination.

The computer 104 is coupled to any suitable utilization apparatus including a display system, a printer, or the like for providing an output to the user of the apparatus.

In operation of the apparatus of the invention 10, as the aircraft flies along its path, the optical system 34 constantly scans the ground, both a set distance forward of the aircraft and directly beneath the aircraft. With each scan, forward hot spot information, as to thermal energy, time and location, is stored in register 102 and computer 104. Each scan is stored in a separate field of register 102. Simultaneously, nadir scan information, as to thermal energy, time and location, is stored in a register 150 and computer 104 which are cleared of this nadir information after a few seconds following each scan. The output of register 150 and the information in each field of register 102 are compared in the comparator 160.

After a precise number of scans or time delay, as determined by the velocity and altitude (V/H) of the aircraft, a particular forward scan line should be directly below the aircraft, and each of the hot spots seen on the forward scan should appear in a predicted position along the scan line, unless the target is in motion.

The computer is thus able to compare two related forward and nadir scans to compare the locations of hot spots, and, as noted above, if the locations of a hot spot are the same on the two scans, then the hot spot is not a moving object. However, if the computer sees that the hot spot has moved from the position on the forward scan, then the object is a moving object, and that information can be provided to the system operator.

Figure 2:
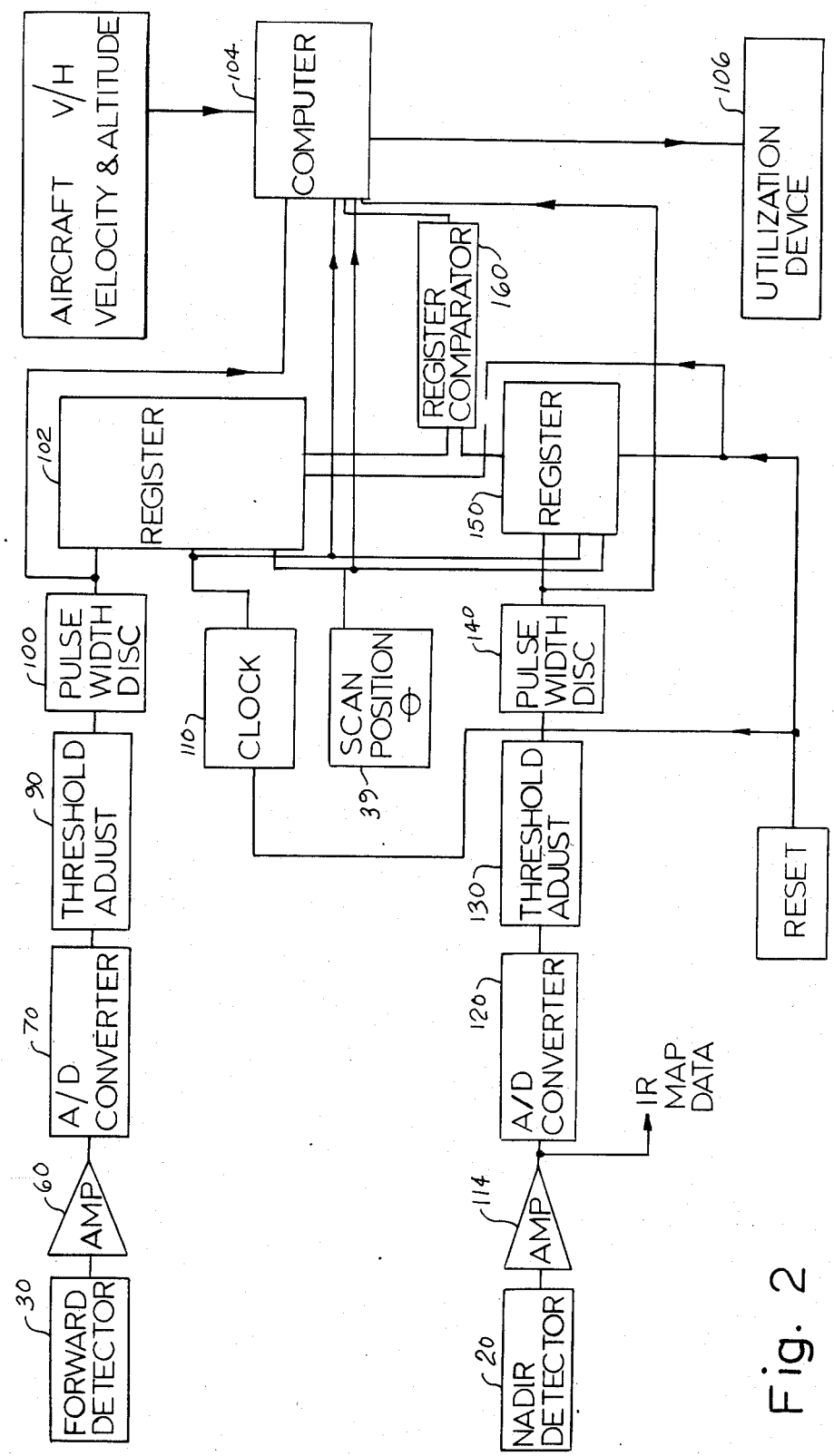
FIG. 2 is a schematic representation of the electronic system of the invention.

It is noted that, in operation of the system shown in FIG. 2, the analog-to-digital (A/D) converter permits an accurate threshold level to be set, above which all emissions are considered potential targets; the pulse width discriminator counts the resolution elements or transverse extent of each occurrence of the threshold being exceeded and thereby discriminates against hot bodies which are too large to be true targets. The remaining data bits encoded with time and scan position are stored in a register, and this data is further processed with stored information from subsequent scans of this same detector to eliminate detections which are excessive in the on-track extent. By this technique, initial data storage is reduced to a small fraction of the elements scanned.

If desired, to the predicted target position, a factor can be added to compensate for uncorrected roll, pitch and yaw and errors in the computer inertial assembly. Criteria are thus established which determine a minimum target velocity within which a line comparison is made with the stored data.

Four outputs can result from the computer logic analysis as follows:

a. A "hot-spot" seen on the initial forward-looking scan, but not seen on the vertical plane, may be a result of terrain foliage masking.

b. A "hot-spot" seen on the vertical scan, but not seen on the initial forward-looking scan, may also be due to terrain foliage masking.

c. A "hot-spot" seen on both scans superimposed within the error criteria indicates a stationary target.

d. A dual "hot-spot" seen in close proximity on both scans, as determined by their scan addresses, indicates a definite moving target. Maximum "hot-spot" separation is determined by pre-set proximity criteria based upon maximum predicted velocity of ground targets. Detections outside of this limit would be noted as separate targets. This technique is applicable to FLIRS (Forward-Looking Infrared Sensors) by picking off the outputs of two spatially separated detectors in the focal plane and maintaining the entire sensor in a stationary mode.

For Real Time Display of infrared information, when a target is detected by a line scan sensor, and the display in utilization device 106 is of the "waterfall" or moving window type (newest information on top, old information rolling off the bottom of the CRT) a moving target would be noted, in real time, by a computer-generated blinking arrow pointing in the direction of motion, with velocity annotation. A prediction of future position can also be included. Coordinate location of the target can be read out by standard light pen technology coupled with aircraft flight path information stored in the ground or airborne computer. Suspected stationary targets can be marked by special annotation and located in a similar manner.

Figure 3:
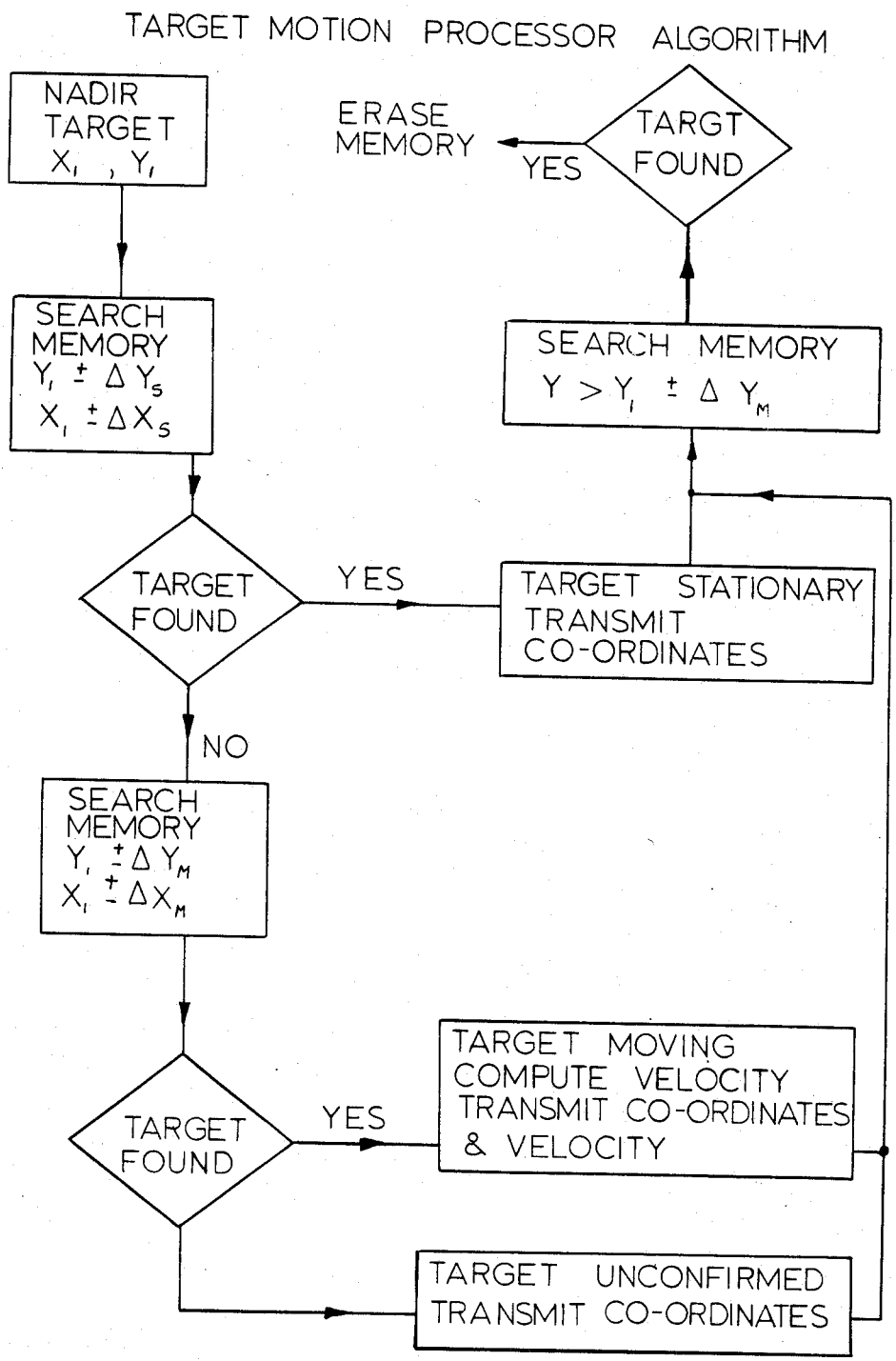
FIG. 3 is a target motion processor algorithm.

In the system 10, all of the computer-comparison-discriminator circuitry is carried in the aircraft and is controlled by a microprocessor. A flow diagram of the processor algorithm is shown in FIG. 3 wherein target (hot spots) coordinates are stored in sequence by row (Y) and position (X) in the row.

What is claimed is:

1. An infrared object detection system comprising:
   optical scanning means in an aircraft moving in a longitudinal direction for continuously scanning along first and second transverse parallel paths on the ground,
   first and second detectors positioned to receive infrared radiation from respective first and second paths, said optical scanning means directing infrared radiation from objects in said first and second paths onto respective first and second detectors, said first path being spaced forwardly of said second path, said second path being substantially the same as said first path upon forward movement of said aircraft over said first path,
   first electronic circuit means coupled to said first detector for generating a first signal containing information relating to objects on the ground in said first path which radiate a certain level of infrared radiation,
   a first storage means for receiving and storing said first signal information along with information identifying the time and the location along said first path from which said first signal information originated,
   second electronic circuit means coupled to said second detector for generating a second signal containing information relating to objects on the ground in said second path which radiate a certain level of infrared radiation,
   a second storage means for receiving and storing said second signal information along with information identifying the time and the location along said second path from which said second signal information originated, and
   means for comparing the information in said first and second storage means to determine the presence or absence of the same information in each, the presence of the same information representing the presence of stationary objects in said first path and the presence of different information representing possible moving objects in said first path.

2. The system defined in claim 1 including an optical encoder coupled to said first and second storage means for providing information relating to the position of objects in said scanning paths.

3. The system defined in claim 1 wherein said optical scanning means and said first and second electronic circuit means provide information relating to the thermal energy and position of objects in said first and second paths.

4. The system defined in claim 1 wherein said storage means includes
   registers and said means for comparing includes a comparator circuit, said first detector being connected in series with an analog-to-digital converter, a threshold adjusting circuit; a pulse width discriminator, and a first register;
   said second detector being connected in series with a second analog-to-digital converter, a second threshold adjusting circuit, a second pulse width discriminator, and a second register;

said first and second registers being connected to said comparator circuit; and a computer coupled to the output of said comparator and containing information received from the comparator and other electronic apparatus in said aircraft for comparing all information received and providing output information relating to the presence or absence of the same objects in each of said paths.

5. The method of detecting objects by means of infrared scanning comprising the steps of:

scanning a first infrared detector along a first path on the ground from an aircraft traveling on a course generally transverse to said path, said path being at a selected angle ahead of the aircraft, said first detector receiving infrared radiation from objects in said first path;

scanning a second infrared detector along a second path which is substantially the same as said first path when the aircraft is approximately directly over said second path and receiving infrared radiation from objects in said second path;

storing information received by said first and second detectors from said first and second paths; and comparing the patterns of infrared radiation received from said first and second paths to determine whether objects in said first path are present at the same locations in said second path.

6. The method defined in claim 5 and including the step of selecting a minimum level of infrared radiation for processing electronically and for comparison to determine the presence or absence of infrared emitting objects.

7. The method of detecting objects by means of infrared scanning comprising the steps of:

scanning a first infrared detector along a first path on the ground from an aircraft traveling on a course generally transverse to said first path, said first path being at a selected angle ahead of the aircraft, said first detector receiving infrared radiation from objects in said first path and providing output analog signals representing said objects;

converting said analog signals to digital signals;

adjusting the threshold of said digital signals to obtain level-adjusted digital signals representing a minimum level of infrared radition received from objects in said first path;

passing said level-adjusted digital signals through a first pulse width discriminator to remove signals representing infrared emitting objects of excessive width to provide final signals for comparison;

storing said signals from said first pulse width discriminator;

scanning a second infrared detector along a second path which is substantially the same as said first path when the aircraft is approximately directly over said second path and receiving infrared radiation from objects in said second path and providing second output analog signals representing said objects on said second path;

converting said second analog signals to second digital signals;

adjusting the threshold of said second digital signals to obtain second level-adjusted digital signals representing a minimum level of infrared radiation received from objects in said second path;

passing said second level-adjusted digital signals through a second pulse width discriminator to remove signals representing infrared emitting objects of excessive width to provide second final signals for comparison;

storing said signals from said second pulse width discriminator; and comparing said first and second final signals received from said first and second paths to determine whether objects in said first path are present at the same locations in said second path.

* * * * *